UNITED STATES PATENT OFFICE.

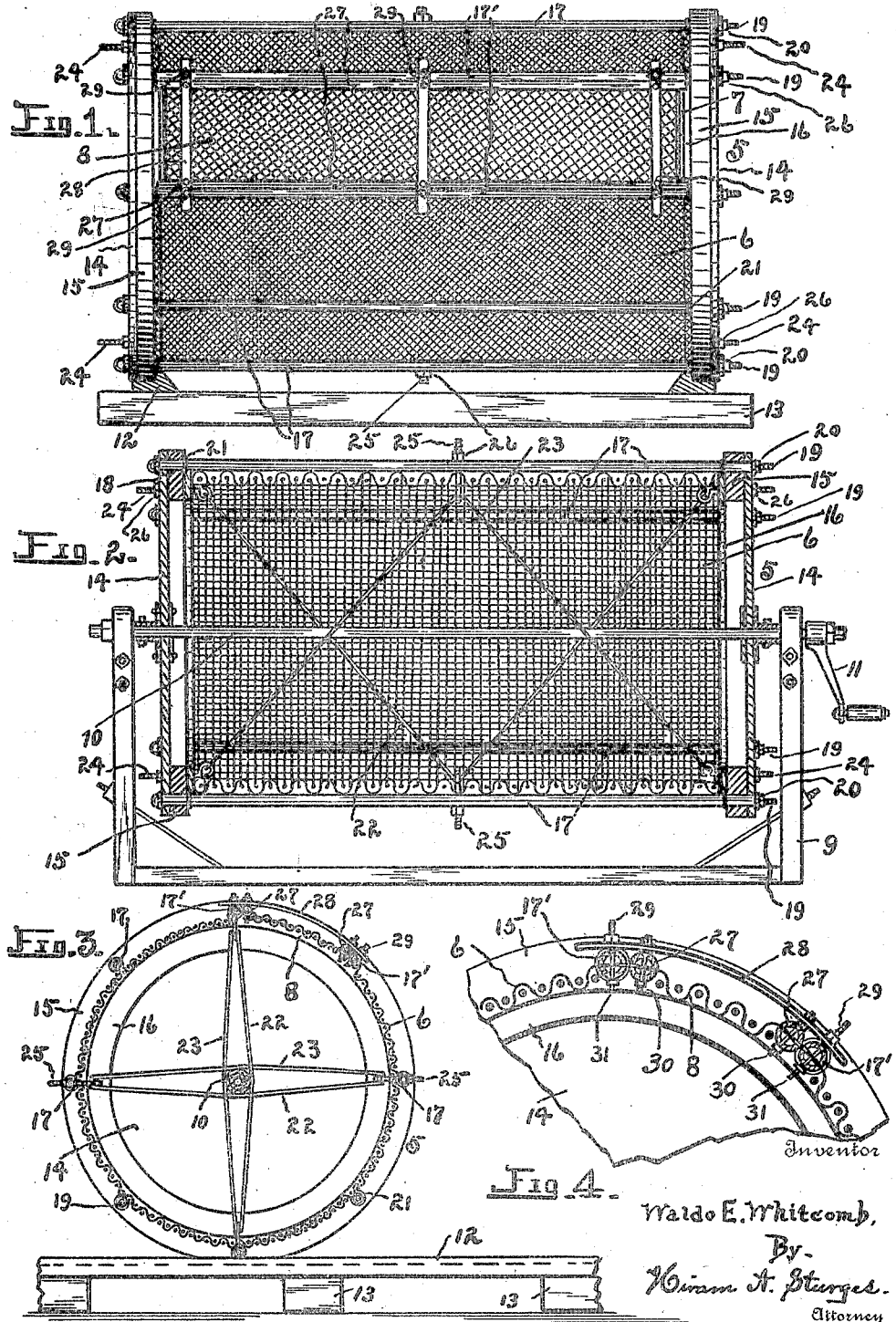

WALDO E. WHITCOMB, OF WINNEBAGO, NEBRASKA.

GRAIN-DRIER AND STORAGE-BIN.

1,284,007.	Specification of Letters Patent.	Patented Nov. 5, 1918.

Application filed June 11, 1918. Serial No. 239,495.

*To all whom it may concern:*

Be it known that I, WALDO E. WHITCOMB, a citizen of the United States, residing at Winnebago, in the county of Thurston and State of Nebraska, have invented certain new and useful Improvements in Grain-Driers and Storage-Bins, of which the following is a specification.

This invention relates to a container for the storage and evaporation of moisture from grain, and has for its principal object to provide containers so arranged that corn or small grain or unshelled corn may be conveniently received and delivered and may be effectively and conveniently agitated to cause substantially uniform exposure to the air so that all excess moisture will be removed.

The invention consists of the novel construction, combination and arrangement of parts as described herein and claimed, and as illustrated in the accompanying drawing, wherein,—

Figure 1 is a view of a grain drier and storage bin in side elevation embodying my invention, the same being mounted upon a track. Fig. 2 is a view of the bin in longitudinal section, the mounting being upon a frame, for manual rotation. Fig. 3 is a view of the bin in transverse section. Fig. 4 is an enlarged detail relating to Fig. 3.

Referring now to the drawing for a more particular description, the invention broadly consists of a cylindrical container 5 provided with a foraminous jacket 6 having an aperture 7, best shown in Fig. 1, for receiving or removing the grain, a cover or lid 8 for the aperture, and means for revolving the container.

The interstices for the jacket 6 may be comparatively large if unshelled corn is to be stored and dried, and may have any degree of fineness required as a holder for shelled corn or any kind of small grain. The device therefore is substantially of tank or barrel shape, and may be conveniently rolled or rotated. In Fig. 2 a frame 9 is shown to provide bearings for a shaft 10 upon which the container is mounted so that, by use of a crank 11 a rotation may be conveniently effected. In Figs. 1 and 3 a track 12 and suitable cross-supports 13 are shown, and the containers may be rolled on said track. However while these mountings for the containers have been found to be of advantage, I do not wish to be understood as limiting myself to these details, the important features being that the cylindrical tanks be disposed horizontally for rotation, and that they be provided with a foraminous jacket and that the parts shall be so arranged that the jacket will be free from the ground or other obstruction to permit exposure of the grain to the air, means being provided to prevent sagging of the foraminous jacket.

In operation, the container may be partly rotated until the aperture 7 is disposed at its uppermost part; the grain is then placed to partly or nearly fill the container, and it is obvious that if the latter is rotated or partly rotated, the grain will be shifted and its position so changed that the air will have access thereto for causing a desired evaporation of the moisture.

The use of the device is particularly of advantage for the storage of corn which has been gathered during wet weather or before it has become hardened on the ear, and known as "soft corn"; also for the temporary storage of wheat or other small grain to prevent the objectionable effects of moisture, and for the treatment of all kinds of grain intended to be used for seed or replanting.

For convenient removal of the contents, it is apparent that the lid may be removed while disposed at the lowermost part of the container, the latter being suitably rotated for this purpose, as may be required.

In order that the foraminous jacket of the container will be practically unobstructed at all times and that sagging will be prevented and that manufacture of the device will be practical and convenient, a pair of comparatively thin disks 14 are employed, each being provided, on its inner side with a reinforcing rim 15, the inner side of each rim having a circular ledge 16 upon which wirecloth, wire mesh or other element constituting a rectangular foraminous sheet or jacket 6 may be secured.

Numerals 17 and 17' indicate a plurality of normally rectilinear tubes of uniform length disposed outwardly of the jacket 6 at uniform radial distances, and uniformly spaced apart, their ends being mounted in apertures 18 (Fig. 2) which are formed in the disks 14 and rims 15, and by means of rods 19, which traverse the tubes, the disks 14 may be pressed toward each other, said rods being provided at their ends with keepers 20 threaded thereon, the tubes preferably being provided with collars 21 to limit or resist an inward movement of the disks.

The containers may have any suitable length or diameter, and to prevent bending or sagging of the tubes, which otherwise might be occasioned by the weight of the grain, cables 22 and 23 are employed in pairs, their ends being mounted upon the longitudinally adjustable hooks 24 which are mounted upon the ends of the container and supported midway between their ends upon hooks 25 which are mounted in the tubes, suitable apertures being provided for receiving the threaded shanks of the hooks, and by rotating the keepers 26 it is obvious that the cable may be drawn to a taut condition to prevent sagging of the tubes.

Since the tubes may be maintained rectilinear by the means described, the containers may be readily rolled or rotated, and the movement or displacement of the grain, within the container, will be practically uniform.

While any suitable frame may be provided for the foraminous lid or cover, the preferred frame consists of a pair of tubes 27 connected by cross-bars 28, the latter being removably secured upon the pair of parallel, adjacent tubes 17', adjacent to the aperture 7 of the container by means of bolts 29 or other equivalent means.

As a matter of convenience, the pair of tubes 27, as best shown in Fig. 4, are incised longitudinally for receiving the terminals of the rectangular, foraminous sheet or web 8, suitable bolts 30 being used for securing the same, and in like manner, the pair of tubes 17' are incised longitudinally for receiving the end portions of the rectangular, foraminous sheet or jacket 6, suitable bolts 31 being employed for securing the ends of said sheet to said tubes, said tubes 17', aside from their incisions, being the same in all respects and discharging the same functions as the secondary tubes 17.

As described, the mounting of the jacket 6 is between the tubes 17 and ledges 16, and outward pressure occasioned by the grain will be supported by the tubes. The particular arrangement of the disks with their ledges, and the mounting for the tubes results in a material saving of labor and is of advantage, but in instances where the tubes must sustain a considerable weight, for containers of more than ordinary length and diameter, it is necessary to prevent sagging, for otherwise the grain will not be shifted uniformly, and rotation of the container would be attended with difficulty, and therefore the simple and inexpensive means mentioned are provided to prevent sagging. Also it will be appreciated that the interstices for members 6 and 8 should be practically unobstructed so that air may circulate properly, and in the present instance the container is supported in such manner that the foraminous webs 6 and 8 engage the tubes only, and therefore evaporization is permitted to advantage. It is considered that manufacture of the device as described may be practical and economical since the parts are few and free from complications.

What I claim as my invention and desire to secure by Letters Patent is,—

1. In a revoluble container, a pair of substantially parallel, adjacently disposed disks each being provided with an annular ledge, substantially parallel tubes disposed adjacent to each other between and engaging the disks outwardly of said ledges; a rectangular, foraminous sheet inwardly of the tubes circumscribing a part of each ledge with its longitudinal edges secured to two adjacent tubes to provide an aperture, and a foraminous lid removably mounted on the tubes to make a closure of said aperture.

2. A revoluble container for the purposes described, comprising a pair of disks disposed adjacent to each other end to end, a pair of longitudinally incised, substantially parallel tubes disposed between and in engagement with said disks near the peripheries thereof, secondary tubes disposed substantially parallel with the incised tubes between and also engaging said disks near the peripheries thereof, a rectangular, foraminous sheet disposed inwardly of the secondary tubes with its longitudinal edges engaged by the incised tubes and providing an opening between the last named tubes, and a foraminous lid removably connected with the incised tubes to make a closure of said opening.

3. In a grain drier and container, a pair of disks disposed adjacent to each other end to end, each being provided with a circular ledge, a pair of longitudinally incised substantially parallel tubes disposed outwardly of said ledges between and in engagement with said disks, secondary tubes disposed outwardly of said ledges substantially parallel with the incised tubes between and engaging said disks, a rectangular, foraminous sheet disposed between the ledges and the secondary tubes with its longitudinal edges engaged by the incised tubes and providing an opening between the last named tubes, a foraminous lid removably connected with the incised tubes to make a closure of said opening, said container being arranged to have revoluble movements to cause movements of the grain from one part of the container to another to facilitate exposure of the grain to the atmosphere.

In testimony whereof, I have affixed my signature in presence of two witnesses.

WALDO E. WHITCOMB.

Witnesses:
 HIRAM A. STURGES,
 ARTHUR H. STURGES.

Copies of this patent may be obtained for five cents each, by addressing the "Commissioner of Patents, Washington, D. C."